E. FINCH.
POTATO DIGGER.

No. 105,324.        Patented July 12, 1870.

Witnesses.
John A. Straight.
H. M. Hopkins.

Inventor
Eugene Finet
By Geo. M. Hopkin

UNITED STATES PATENT OFFICE.

EUGENE FINCH, OF ALBION, NEW YORK.

IMPROVEMENT IN POTATO-DIGGERS.

Specification forming part of Letters Patent No. 105,324, dated July 12, 1870.

*To all whom it may concern:*

Be it known that I, EUGENE FINCH, of Albion, in the county of Orleans and State of New York, have invented certain Improvements in Potato-Diggers, of which the following is a specification.

My invention relates to the combination of a scoop, an endless apron, a shaker, and an adjustable delivering-spout, arranged in a suitable frame, which is supported on four wheels.

My invention also relates to the combination of colters or cutters with the scoop.

Figure 1:
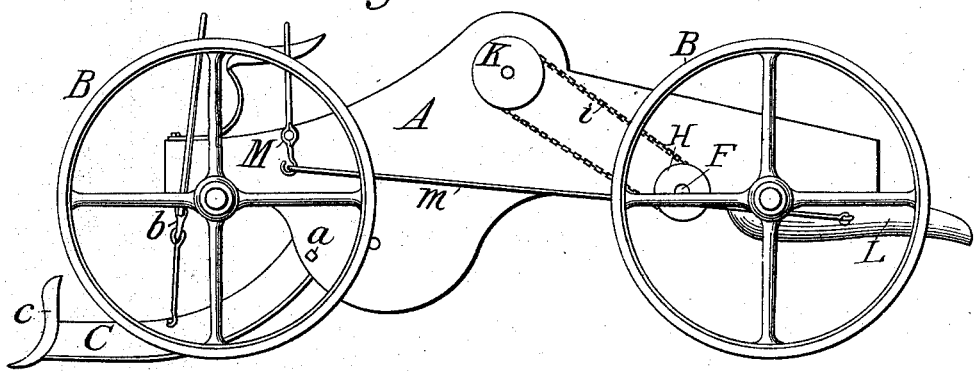
Figure 2:
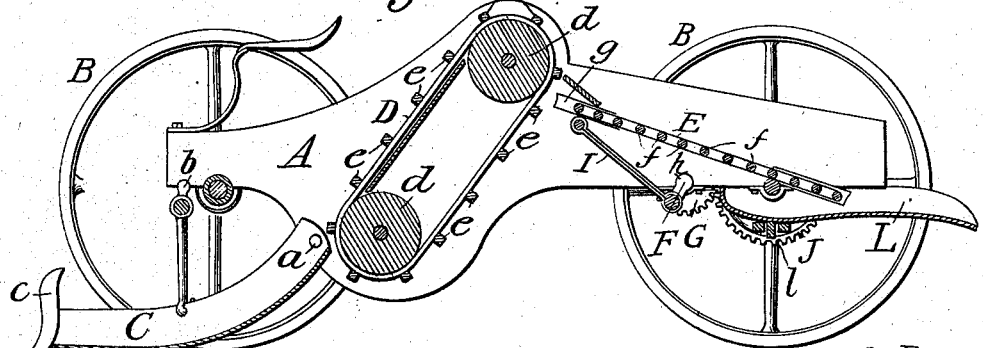
Figure 3:
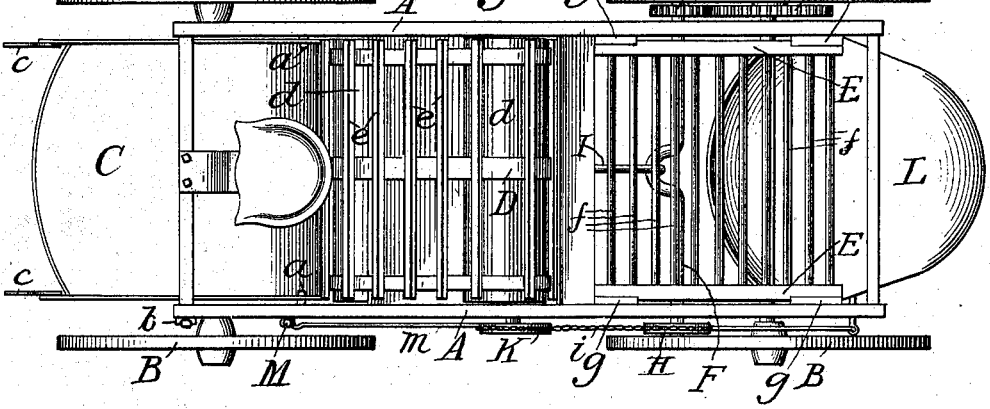

In the accompanying drawings, Figure 1 is a side elevation. Fig. 2 is a longitudinal section. Fig. 3 is top view.

A is the frame of the machine, which is supported on the wheels B B B B.

C is the scoop, of iron or any suitable material, which is pivoted at $a\ a$, and is raised and lowered by means of the lever $b$.

$c\ c$ are colters or cutters attached to the sides of the scoop C, which project beyond the bottom.

D is an endless apron passing around the rollers $d\ d$, and is provided with the ribs or slats $e\ e\ e$, &c.

E is a shaker, which consists of a frame provided with bars $f\ f\ f$, &c., sliding freely in the ways $g\ g\ g\ g$.

F is a shaft running across the frame A, which is bent to form a crank at $h$, and is provided with the pinion G and pulley H.

I is a connecting-rod, which connects the crank $h$ with the shaker E.

J is a cog-wheel attached to the rear wheel, which meshes into the pinion G.

K is a pulley on the upper roller-shaft, which takes its motion from the pulley H through the chain $i$.

L is an adjustable delivery-spout, which swings on the pivot $l$.

M is a lever, which is connected with the spout by means of the rod $m$.

The operation is as follows: The machine is drawn along a row of potato-hills, so that the scoop C may cut under the hills. The earth and potatoes slide onto the endless apron D, which throws all onto the shaker E, which, being rapidly moved back and forth, shakes out the earth, and the potatoes fall out through the spout L to one side or the other, according as it is adjusted by the lever M.

I claim as my invention—

The potato-digger described, consisting of the frame A on wheels B B, scoop C, with cutters $c\ c$ and lever $b$, apron D, shaker E, shaft F, with pinion G, pulley H, connecting-rod I, cog-wheel J, pulley K, and adjustable drilling-spout L, when the parts are arranged as described, for the purpose set forth.

EUGENE FINCH.

Witnesses:
W. C. HAYES,
JOHN A. STRAIGHT.